United States Patent
Gaiser

(10) Patent No.: US 10,422,263 B2
(45) Date of Patent: Sep. 24, 2019

(54) EXHAUST SYSTEM FOR AN INTERNAL COMBUSTION ENGINE

(71) Applicant: Eberspächer Exhaust Technology GmbH & Co. KG, Neunkirchen (DE)

(72) Inventor: Gerd Gaiser, Reutlingen (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 328 days.

(21) Appl. No.: 15/249,836

(22) Filed: Aug. 29, 2016

(65) Prior Publication Data

US 2017/0067381 A1    Mar. 9, 2017

(30) Foreign Application Priority Data

Sep. 3, 2015  (DE) .................. 10 2015 114 723

(51) Int. Cl.
*F01N 3/20* (2006.01)
*F01N 3/30* (2006.01)

(52) U.S. Cl.
CPC ............ *F01N 3/206* (2013.01); *F01N 3/2066* (2013.01); *F01N 3/306* (2013.01); *F01N 2610/00* (2013.01); *F01N 2610/02* (2013.01); *F01N 2610/08* (2013.01); *F01N 2610/1453* (2013.01); *Y02A 50/2325* (2018.01); *Y02T 10/24* (2013.01)

(58) Field of Classification Search
CPC ........ F01N 3/206; F01N 3/2066; F01N 3/306; F01N 2610/00; F01N 2610/02; F01N 2610/08; F01N 2610/1453; Y02A 50/2325; Y02T 10/24
See application file for complete search history.

(56) References Cited

U.S. PATENT DOCUMENTS

| 5,665,318 A | * | 9/1997 | Rembold ........... B01D 53/9431 422/177 |
| 9,617,890 B2 | | 4/2017 | Rusch et al. |
| 2008/0022670 A1 | * | 1/2008 | Ichikawa ............... B01D 53/90 60/299 |
| 2010/0107614 A1 | | 5/2010 | Levin et al. |
| 2010/0212292 A1 | * | 8/2010 | Rusch .................. F01N 3/2066 60/274 |
| 2011/0113759 A1 | * | 5/2011 | Tilinski ................ F01N 3/2066 60/295 |

FOREIGN PATENT DOCUMENTS

| CN | 201763419 U | 3/2011 |
| CN | 204 344 210 U | 5/2015 |
| DE | 199 61 947 A1 | 6/2001 |
| DE | 20 2008 001547 U1 | 4/2008 |
| DE | 10 2006 059 507 A1 | 6/2008 |
| DE | 10 2008 008 564 A1 | 8/2009 |
| DE | 10 2011 116 336 A1 | 4/2013 |
| EP | 1 878 887 A1 | 1/2008 |
| JP | S59 158311 A | 9/1984 |
| WO | 2007/091969 A1 | 8/2007 |

* cited by examiner

Primary Examiner — Brandon D Lee
(74) Attorney, Agent, or Firm — McGlew and Tuttle, P.C.

(57) ABSTRACT

An exhaust system for an internal combustion engine, especially for the internal combustion engine of a vehicle, includes an exhaust gas duct (12) carrying an exhaust gas stream (A) and a reactant release arrangement (18) for releasing a reactant (R) into the exhaust gas stream (A). A bypass flow generation arrangement (25) generates a bypass flow (M) surrounding the reactant stream (R) that is released from the reactant release arrangement (18).

19 Claims, 5 Drawing Sheets

EXHAUST SYSTEM FOR AN INTERNAL COMBUSTION ENGINE

CROSS REFERENCE TO RELATED APPLICATIONS

This application claims the benefit of priority under 35 U.S.C. § 119 of German Patent Application 10 2015 114 723.8 filed Sep. 3, 2015, the entire contents of which are incorporated herein by reference.

FIELD OF THE INVENTION

The present invention pertains to an exhaust system for an internal combustion engine, especially for the internal combustion engine of a vehicle.

BACKGROUND OF THE INVENTION

An exhaust system, in which reducing agent is introduced into the exhaust gas stream through a reactant release arrangement to reduce the pollutant emission, is known from DE 10 2006 059 507 A1. Highly efficient mixing of the reactant with the exhaust gas can be achieved in this prior-art arrangement by the reactant being introduced in a direction into the exhaust gas stream that is directed essentially opposite a main direction of flow of the exhaust gas stream in the area in which the reactant is introduced.

One problem arising in connection with the introduction of reagents, e.g., urea or a urea-water mixture, is that deposits may develop due to reactant precipitating on a wall of the exhaust gas canal carrying the exhaust gas stream. Such deposits are especially critical especially if they occur in the area of the reactant release arrangement which is generally also called injector, because there is a risk, on the one hand, that the correct quantity of reactant cannot be released any longer, and, on the other hand, the direction of propagation of the released reactant may be compromised as well. Depending also on the geometric configuration of the area in which the reactant is released, recirculation zones may develop, in which reactant released in a droplet or spray configuration is recirculated from the reactant release arrangement and can precipitate very close to the area of release, i.e., for example, the tip of an injector. The risk of recirculation is especially great if, as is known from DE 10 2006 059 507 A1, the exhaust gas stream moves the reactant introduced opposite its direction of flow back in the direction of the injector.

SUMMARY OF THE INVENTION

An object of the present invention is to provide an exhaust system for an internal combustion engine, especially the internal combustion engine of a vehicle, as well as a method for introducing reactant into an exhaust gas stream of an internal combustion engine, with which exhaust system and method the formation of reactant deposits can be counteracted.

This object is accomplished according to the present invention by an exhaust system for an internal combustion engine, especially an internal combustion engine of a vehicle, comprising an exhaust gas duct carrying exhaust gas stream and a reactant release arrangement for releasing a reactant stream into the exhaust gas stream, characterized by a bypass flow generation arrangement for generating a bypass flow surrounding the reactant stream released from the reactant release arrangement.

Since a bypass flow surrounding or enveloping the reactant stream is associated with the reactant stream in the exhaust system configured according to the present invention, the risk that reactant droplets will precipitate on the exhaust gas duct or in the area of the reactant release arrangement is reduced. The bypass flow has an effect shielding the reactant release arrangement as well as an effect moving the reactant stream during introduction into the exhaust gas stream and thus it efficiently reduces the risk of development of deposits. The reactant stream is efficiently protected by the bypass flow from an effect of flow separations of the exhaust gas stream. The development of a secondary flow in the area in which the reactant is released is prevented, and the development of secondary droplets separating from the reactant stream is prevented or at least made difficult by the bypass flow surrounding or guiding and shielding the reactant stream.

To achieve efficient guiding or shielding of the reactant stream, it is proposed that the bypass flow surround the reactant stream in relation to a main direction of flow of the reactant at least in some areas and preferably essentially completely. Further, it is especially advantageous in this connection if a main direction of flow of the bypass flow corresponds essentially to a main direction of flow of the reactant stream.

To make it possible to provide the configuration of the bypass flow, which configuration surrounds or envelops the reactant stream, in a reliable manner, it is proposed that the reactant release arrangement comprise a reactant release unit and that the bypass flow generation arrangement comprise a bypass flow release unit surrounding the reactant release unit in a ring-shaped manner.

Uniform distribution of the bypass flow over the circumference and a defined, directed release of the bypass flow can be achieved, for example, by the bypass flow release unit having a preferably ring-shaped bypass flow release body and, upstream of the bypass flow release body, a preferably ring-shaped bypass flow release chamber leading to the bypass flow release body.

Provisions may be made in an embodiment variant that is especially advantageous in terms of simple manufacturability, on the one hand, and in terms of the defined release of the bypass flow, on the other hand, for the bypass flow release body to have a porous configuration, preferably forming a sintered body.

The exhaust system according to the present invention preferably has a bypass flow gas source for feeding bypass flow gas to a bypass flow release unit.

It is proposed in an especially advantageous embodiment variant that the bypass flow be essentially an air flow and that the bypass flow gas source comprise a compressed air source. The use of an air flow to provide the bypass flow offers various advantages. On the one hand, it can be assumed that the air used to generate the air flow has a markedly lower temperature than the exhaust gas flowing in the exhaust gas duct. The air flow can thus be used to protect the reactant release unit from the comparatively high temperature of the exhaust gas stream and to cool the reactant release unit. Further technical measures for removing heat from the area of the reactant release unit can thus be dispensed with. Furthermore, it can be assumed that the air flow used to provide the bypass flow has a lower percentage of water, i.e., a lower water partial pressure, than the exhaust gas stream. This causes the reactant generally introduced in a liquid form, i.e., in the form of a spray or in the form of droplets, to evaporate better due to the interaction with the bypass flow surrounding the reactant stream. This reduces, on the one hand, the risk of development of deposits, and, on the other hand, it leads to better miscibility of the exhaust gas stream with the reactant stream.

To make it possible to provide the air flow, it is proposed that the compressed air source comprise:

an exhaust gas turbocharger or a mechanical charger, or/and a pneumatic brake system, or/and a compressed air pump.

Thus, the compressed air source can consequently comprise essential system areas that are generally present in a vehicle, e.g., an exhaust gas turbocharger or a mechanical charger, which is also called compressor.

In an alternative embodiment of the exhaust system according to the present invention, the bypass flow may be essentially a partial exhaust gas stream. The bypass flow gas source comprises an exhaust gas source in this case. The benefit of the exhaust gas flowing in the exhaust gas duct offers the essential advantage that a comparatively large quantity of bypass flow gas can be made available without this substantially affecting the functionality or the operating characteristics of other system areas. Further, the comparatively warm partial exhaust gas stream acting as a bypass flow supports, because of its high temperature, the evaporation of the reactant, even if the partial pressure of water in the exhaust gas stream is generally higher than in an air stream.

The exhaust gas source may comprise an exhaust gas branch duct branching off from the exhaust gas duct. This branch duct branches off advantageously from the exhaust gas duct upstream of an exhaust gas throttle arrangement. The possibility is thus created that the exhaust gas pressure is set in the area of the exhaust gas branch by correspondingly setting the exhaust gas throttle arrangement such that the necessary quantity of exhaust gas is generated for providing the bypass flow and the necessary exhaust gas pressure is also generated for providing the partial exhaust gas stream. As an alternative or in addition, an exhaust gas quantity-setting valve arrangement may be provided associated with the exhaust gas branch duct. Since it may, furthermore, be advantageous for minimizing pollutants to return a part of the exhaust gas formed in an internal combustion engine into the combustion process, provisions may, furthermore, be made for the exhaust gas branch duct to comprise an exhaust gas return line.

The reactant can be released into the exhaust gas stream in the exhaust system according to the present invention such that a main direction of flow of the bypass flow or/and a main direction of flow of the reactant stream released from the reactant release arrangement essentially corresponds to a main direction of flow of the exhaust gas stream in the exhaust gas duct in the area in which the reactant stream is released.

Provisions may be made in an alternative embodiment for a main direction of flow of the bypass flow or/and a main direction of flow of the reactant stream released from the reactant release arrangement to be essentially opposite a main direction of flow of the exhaust gas stream in the exhaust gas duct in the area in which the reactant stream is released. An especially efficient mixing of the reactant with the exhaust gas is achieved in case of this essentially mutually opposite orientation of the direction of flow of the reactant stream, on the one hand, and of the exhaust gas stream, on the other hand. Based on the shielding of the reactant stream by the bypass flow, which is provided according to the present invention, the risk of development of deposits is nevertheless largely avoided by reactant forced back or recirculated in the direction of the reactant release arrangement.

Provisions may be made in another embodiment variant for the main direction of flow of the bypass flow or/and the main direction of flow of the reactant stream released from the reactant release arrangement to have a pitch angle in the range of +45° to −45° and preferably in the range of +30° to +5° or in the range of −30° to −5° in relation to an orthogonal line of the flow that is essentially orthogonal to the main direction of flow of the exhaust gas stream in the exhaust gas duct in the area in which the reactant stream is released, the main direction of flow of the bypass flow or/and the main direction of flow of the reactant stream having a flow direction component in the direction of the main direction of flow of the exhaust gas stream in case of a positive pitch angle and the main direction of flow of the bypass flow or/and the main direction of flow of the reactant stream having a flow direction component opposite the main direction of flow of the exhaust gas stream in case of a negative pitch angle. The reactant stream and the bypass flow are introduced into the exhaust gas stream essentially transversely in this arrangement, and a pitch angle either in the direction of or opposite the direction of the exhaust gas stream is especially advantageous.

The object described in the introduction is accomplished, furthermore, by a method for introducing reactant into an exhaust gas stream of an internal combustion engine, especially the internal combustion engine of a vehicle, preferably in an exhaust system configured according to the present invention, comprising the measures of:

a) Releasing a reactant stream into the exhaust gas stream, b) Generating a bypass flow surrounding the reactant stream in the area in which the reactant stream is released in at least some areas and preferably essentially completely.

To make it possible to bring about a highly efficient shielding of the reactant stream in the area in which the reactant is introduced into the exhaust gas stream, it is proposed that the reactant stream be released in measure a) essentially in a main direction of flow of the reactant stream and that the bypass flow be released in measure b) in a main direction of flow of the bypass flow that essentially corresponds to the main direction of flow of the reactant stream.

Depending on the design configuration of an exhaust system, there are various possibilities for introducing the reactant into the exhaust gas stream. Provisions may therefore be made in the method according to the present invention for the main direction of flow of the bypass flow or/and the main direction of flow of the reactant stream to correspond essentially to the main direction of flow of the exhaust gas stream in the area in which the reactant stream is released, or for the main direction of flow of the bypass flow or/and the main direction of flow of the reactant stream to be essentially opposite the main direction of flow of the exhaust gas stream in the area in which the reactant stream is released, or for the main direction of flow of the bypass flow or/and the main direction of flow of the reactant stream to be set at a pitch angle in the range of +45° to −45°, preferably in the range of +30° to +5° or in the range of −30° to −5° in relation to a flow orthogonal line that is essentially orthogonal to a main direction of flow of the exhaust gas stream in the area in which the reactant stream is released, the main direction of flow of the bypass flow or/and the main direction of flow of the reactant stream having a flow direction component in the direction of the main direction of flow of the exhaust gas stream in case of a positive pitch angle and the main direction of flow of the bypass flow or/and the main direction of flow of the reactant stream having a flow direction component opposite the main direction of flow of the exhaust gas stream in case of a negative pitch angle.

Air can be used to generate the bypass flow with the above-described advantages concerning the cooling of the arrangement provided for releasing the reactant, on the one hand, and concerning the support of the reactant evaporation, on the other hand. To support the evaporation of the reactant, provisions may advantageously be made for the air to be heated by the exhaust gas stream before the bypass flow is generated. As an alternative, exhaust gas branched off from the exhaust gas stream may be used for the bypass flow.

It should be noted that especially if a comparatively large quantity of bypass flow gas is necessary to generate the bypass flow, a combination of air and exhaust gas, i.e., an air/gas mixture, may be used as a bypass flow gas to generate the bypass flow.

The present invention is described in detail below with reference to the attached schematic figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
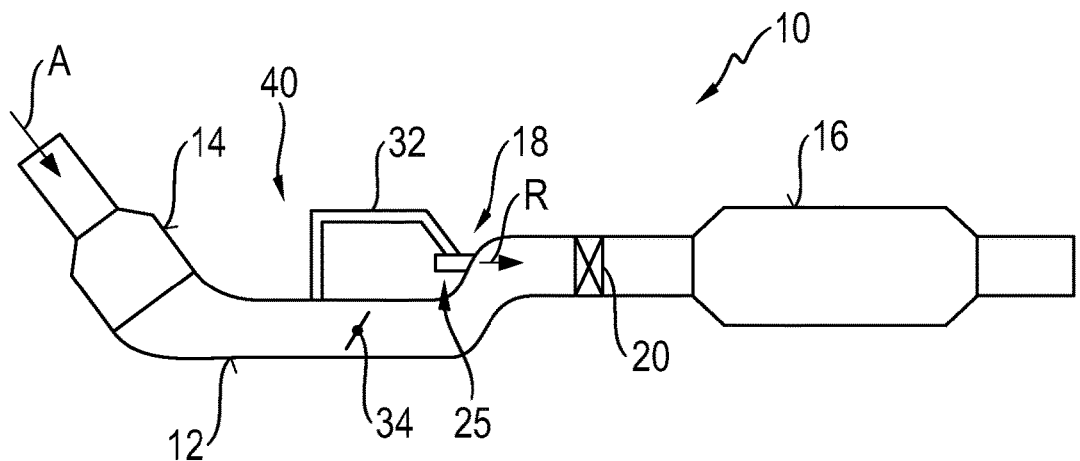
FIG. 1 is an exhaust system for an internal combustion engine of a vehicle in a simplified view.

Referring to the drawings, an exhaust system that can be used in connection with an internal combustion engine of a vehicle is generally designated by 10 in FIG. 1. The exhaust system comprises an exhaust gas duct 12, which is built, for example, with a plurality of pipe sections and housing areas and in which the exhaust gas released by an internal combustion engine flows as an exhaust gas stream A through different system areas. For example, an oxidation catalytic converter may be arranged in an upstream area 14 of the exhaust gas duct 12 and a particle filter may be arranged downstream thereof. A catalytic converter arrangement may be provided in a downstream area 16 of the exhaust gas duct 12 for the selective catalytic reduction. Reactant, e.g., a urea-water solution, may be introduced as a reactant stream R into the exhaust gas stream A through a reactant release arrangement generally designated by 18 upstream of this catalytic converter arrangement in order to support the selective catalytic reduction. A mixing arrangement 20 may be provided downstream of the reactant release arrangement 18 generally designated as an injector for good mixing of the reactant with the exhaust gas.

It should be noted that the exhaust system 10 shown only schematically in FIG. 1 may, of course, also be varied in many different ways concerning the system areas contained in it and also the relative position of these system areas. Thus, as an alternative or in addition, a reactant release arrangement may be provided for releasing fuel as a reactant into the exhaust gas stream, in association with a particle filter or a nitrogen oxide storage catalytic converter for carrying out a regeneration of said exhaust system. The design and functional aspects described below with reference to the reactant release arrangement 18, which may be configured, for example, for releasing a urea/water solution as a reactant, may be applied in the same manner for a reactant release arrangement that is provided for releasing another reactant, i.e., for example, fuel, into the exhaust gas stream.

Figure 2:
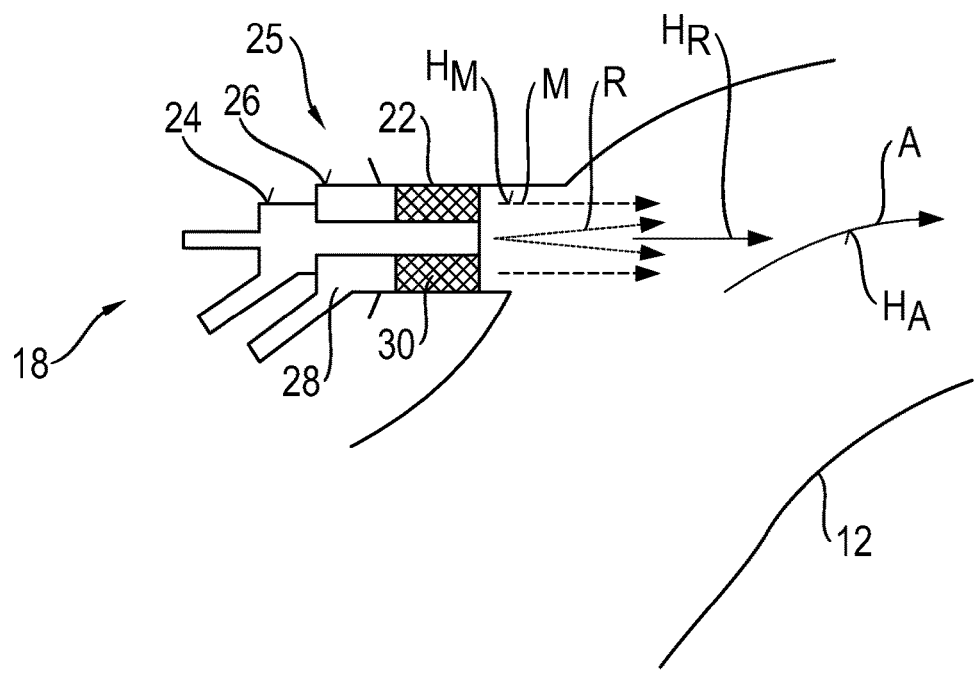
FIG. 2 is a detail view of the exhaust system according to FIG. 1 to illustrate the reactant release into an exhaust gas stream.

FIG. 2 shows that to arrange the reactant release arrangement 18 on the exhaust gas duct 12, a mounting fitting 22 may be provided, into which the reactant release arrangement 18 can be inserted in a gas-tight manner. The reactant release arrangement 18 comprises a reactant release unit 24, which receives the reactant fed, in general, in the liquid form and releases same via an injection nozzle or the like in the form of a reactant stream R. The reactant stream R may be released as a continuous or pulsating stream, with the reactant leaving the reactant release unit 24 in the form of a spray or droplets. The reactant or the reactant stream R now propagates in a conical shape, and there is a main direction of flow of the reactant stream, which can be assumed to be a central line of such a propagation cone, in case of such a conical release as well.

In the arrangement of the reactant release arrangement 18 shown in FIG. 2, the main direction of flow of the reactant stream $H_R$ in the area of the entry of the reactant stream R into the exhaust gas duct 12 corresponds essentially to a main direction of flow of the exhaust gas stream, $H_A$, which is indicated in FIG. 2 by the flow arrow representing the exhaust gas stream A. It should be noted that the main direction f flow of the exhaust gas stream, $H_A$, may be represented essentially by a central longitudinal line of the exhaust gas duct 12, wherein local deviations and turbulences leading to local deviations may exist depending on the geometric configuration.

The reactant release arrangement 18 comprises, further, a bypass flow generation arrangement 25. The bypass flow generation arrangement 25 is provided and configured for generating a bypass flow M surrounding the reactant stream R in relation to the main direction of flow $H_R$. The bypass flow generation arrangement 25 comprises for this purpose a bypass flow release unit 26 with a ring-shaped bypass flow release chamber 28 receiving the bypass flow gas and, downstream therefrom, a bypass flow release body 30. The bypass flow release body 30 may be arranged, for example, in a housing, in which the ring-shaped bypass flow release chamber 28 is also formed, and may surround the reactant release unit 24 in a ring-shaped manner, just as the bypass flow release chamber 28. The bypass flow release body 30 is preferably configured with a porous structure, for example, as a sintered body, so that a defined outflow characteristic can be generated for the bypass flow gas introduced into the bypass flow release chamber 28 in terms of both the quantity discharged and the direction of discharge. A porous structure may also be obtained by configuring the bypass flow release body 30 as a wire mesh, knitted fabric, wire screen or as a foam structure or as a close-meshed honeycomb structure. Combinations of different such porous bodies are also possible for building the bypass flow release body 30. The bypass flow release body may be provided, in principle, especially in the area in which the bypass flow gas leaves that area to affect the direction of flow with rib-like flow guide elements.

The bypass flow M fully surrounding or enveloping the reactant stream R has a main direction of flow of the bypass flow, HM, which essentially corresponds to the main direction of flow of the reactant stream, $H_R$. Since the bypass flow M is preferably released as a laminar flow, even though there is an interaction between the reactant and the bypass flow gas in the area in which the bypass flow M adjoins the reactant stream R, a substantial mixing will not occur. For example, the bypass flow M may be released as an essentially cylindrical ring flow.

It is achieved due to the bypass flow M and the jacketing or enveloping effect generated with this for the reactant stream R that the reactant released by the reactant release unit 24 can essentially not come into contact with the wall of the exhaust gas duct 12 or of the fitting 22. The risk that a precipitate or deposit of reactant droplets will form especially in the area in which the reactant is released into the exhaust gas duct 12 can thus largely be eliminated. However, the bypass flow M develops not only such a shielding effect, but it may also develop an effect guiding the reactant or the reactant stream R especially in the area in which the reactant is released into the exhaust gas stream A. The reactant is thus moved away from the site of release by the bypass flow M in a defined manner, so that a recirculation of reactant or reactant droplets into the area of the fitting 22 is also largely avoided and the reactant stream R is introduced into the exhaust gas stream A in a defined manner. It becomes possible due to this shielding, on the one hand, and guiding of the reactant stream R, on the other hand, to introduce larger quantities of the reactant into the exhaust gas stream A, as a result of which more efficient utilization of the reaction to be carried out with the addition of the reactant can be achieved.

Exhaust gas branched off from the exhaust gas stream A is used to generate the bypass flow R in the example shown in FIGS. 1 and 2. A part of the exhaust gas can preferably be branched off for this from the exhaust gas duct 12 via an exhaust gas branch line 32 upstream of the location at which the reactant stream R and the bypass flow M are generated by the reactant release arrangement 18 and sent in the direction of the bypass flow release unit 26, especially to the bypass flow release chamber 28. To make it possible to set defined pressure conditions in the area of the exhaust gas branch and to set hereby the quantity of exhaust gas flowing over the exhaust gas branch line 32, the exhaust gas used as bypass flow gas is preferably branched off to provide the bypass flow M upstream of an exhaust gas throttle arrangement 34, which is arranged in the exhaust gas duct 12 and whose throttling characteristic can advantageously be set. As an alternative or in addition, an exhaust gas quantity-setting valve arrangement, not shown in FIG. 1, which can provide the suitable quantity of bypass flow gas suitable for the quantity of reactant to be injected and the suitable pressure of the bypass flow gas to generate the bypass flow M, for example, also depending on the operating point of an internal combustion engine, may be provided in association with the exhaust gas branch duct 32.

By using a part of the exhaust gas introduced into the exhaust gas duct 12 to generate the bypass flow M, the possibility of using a comparatively large quantity of bypass flow gas to generate a correspondingly intensive bypass flow M is provided. At the same time, the exhaust gas branched off as bypass flow gas has a comparatively high temperature, which supports the evaporation of the reactant provided, for example, as a urea/water mixture, on introduction into the exhaust gas duct 12. During the flow through the exhaust gas branch line 32, the temperature of the exhaust gas flowing therein may drop slightly compared to the temperature of the exhaust gas continuing to flow in the exhaust gas duct 12, so that the reactant release unit 24, especially the tip area of said unit exposed towards the exhaust gas duct 12, is thermally somewhat shielded against the even hotter exhaust gas stream A due to the shielding also generated by means of the bypass flow M.

Figure 3:
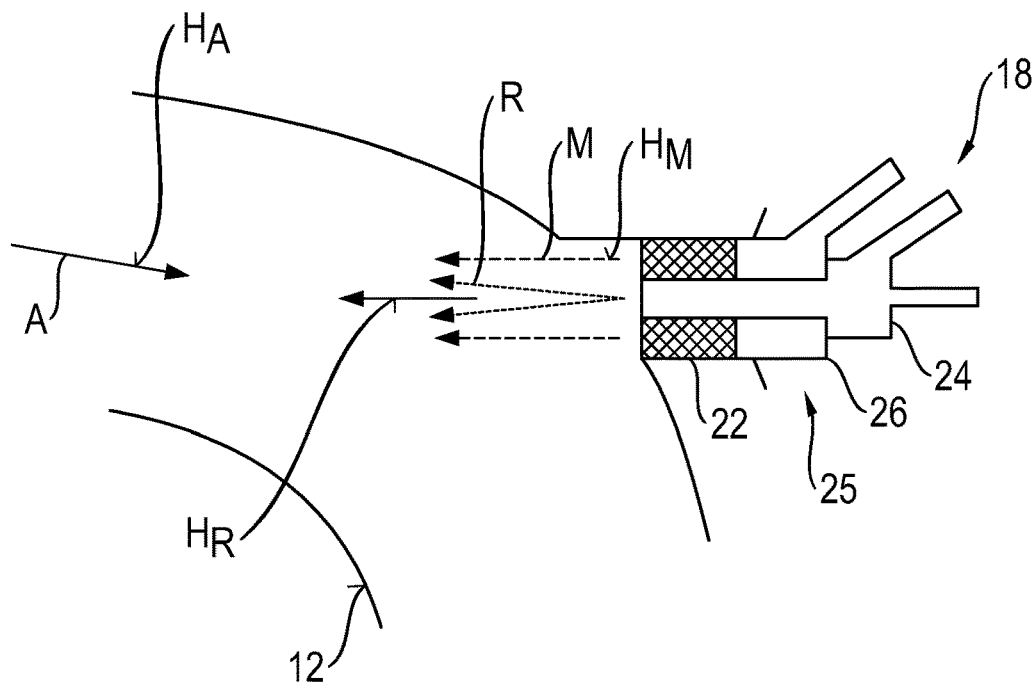
FIG. 3 is a view of an alternative type of reactant release corresponding to FIG. 2.

In reference to FIGS. 3 through 6, various configurations will be described below, in which the reactant release unit 24 can be positioned in relation to the exhaust gas duct 12 or the exhaust gas stream A. FIG. 3 shows an embodiment in which the reactant release arrangement 18 is positioned such that the reactant released by the reactant release unit 24 or the reactant stream R enters the exhaust gas duct 12 with a main direction of flow $H_R$ which is directed essentially opposite the main direction of flow of the exhaust gas stream, $H_A$, in this area. The bypass flow M is also released through the bypass flow release unit 26 in a direction that essentially corresponds to the main direction of flow of the reactant stream, $H_R$, and is thus likewise essentially opposite the main direction of flow of the exhaust gas stream, $H_A$.

Due to the reactant thus being introduced into the exhaust gas duct 12 and hence also into the exhaust gas stream A essentially opposite the main direction of flow of the exhaust gas stream, $H_A$, especially efficient mixing of the reactant with the exhaust gas is achieved based on the fact that turbulences are also generated in this manner. However, the bypass flow M, which envelops the reactant stream R especially in the area close to the fitting 22, ensures at the same time that a contact of the reactant or reactant droplets with the inner surface of the exhaust gas duct 12 or of the fitting 22 is largely avoided and that a reactant recirculation into the area of the fitting 22 and release of the reactant from the reactant release unit 24 is also largely avoided.

Figure 4:
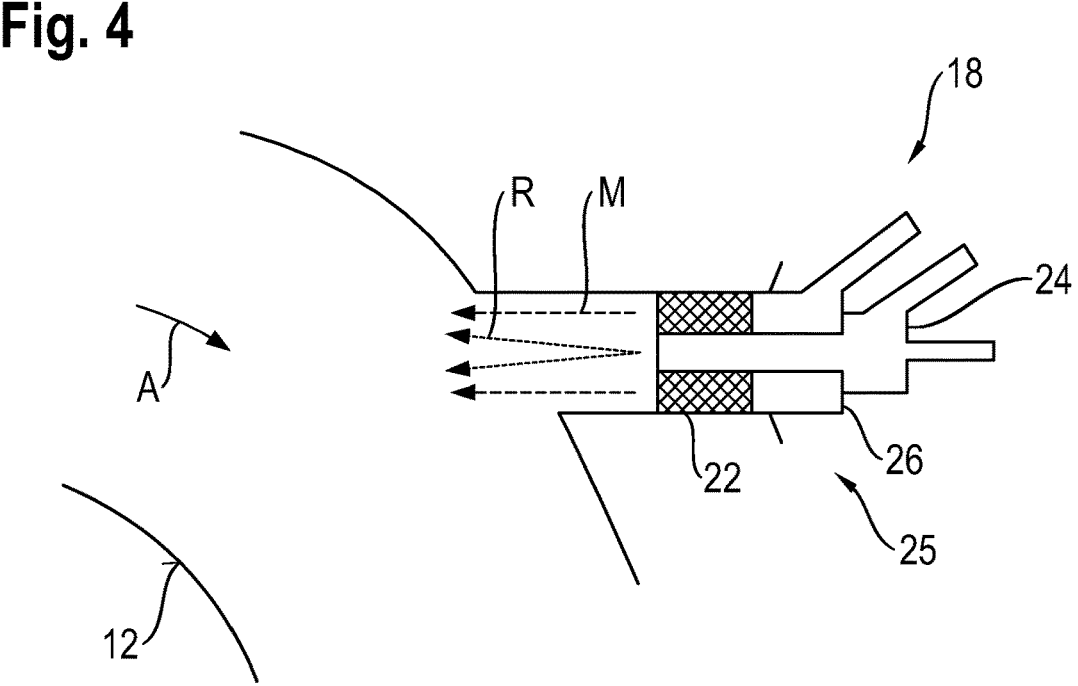
FIG. 4 is a view of an alternative type of reactant release corresponding to FIG. 2.

FIG. 4 shows a configuration in which the reactant stream R and also the bypass flow M are also introduced into the exhaust gas duct 12 essentially opposite the exhaust gas stream A. It is made possible in this variant, for example, by making the fitting 22 somewhat longer, to arrange the reactant release unit 24 somewhat farther withdrawn into the fitting 22, so that the location at which the reactant leaves the reactant release unit 24 is located at a distance from the exhaust gas duct 12 and thus also from the exhaust gas stream A. The bypass flow M envelops the reactant stream R especially also in the area of the fitting 22 and thus ensures that a contact of the reactant R with the inner surface of the fitting 22 as well as a recirculation of reactant into the area of the fitting 22 will extensively fail to materialize.

It should be noted that by setting the bypass flow gas pressure, on the one hand, and also by configuring the bypass flow release body 30, on the other hand, the flow characteristic of the bypass flow M and hence also the effect thereof on the reactant stream R can be influenced. Thus, the guiding effect of the bypass flow for the reactant stream R can be made highly pronounced by a correspondingly high velocity of the reactant stream R. A comparatively large quantity of bypass flow gas can contribute to an especially efficient shielding of the reactant stream R radially outwardly in relation to the main direction of flow of the reactant stream, $H_R$.

Figure 5:
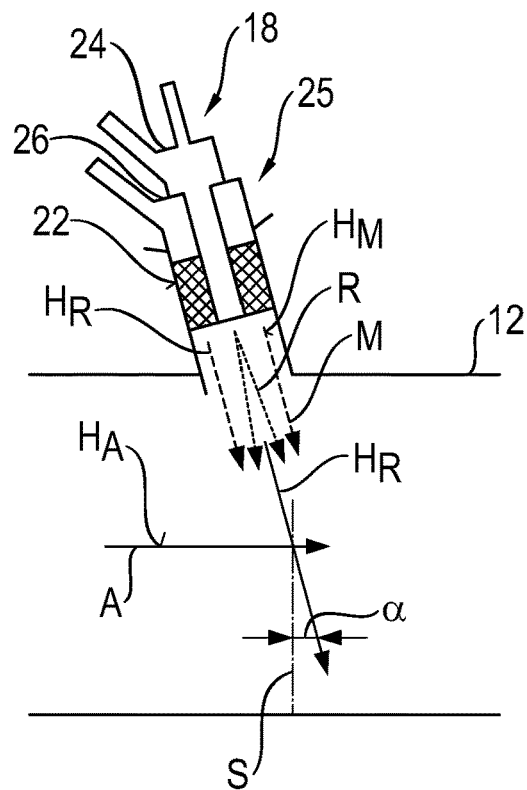
FIG. 5 is a view of an alternative type of reactant release corresponding to FIG. 2.
Figure 6:
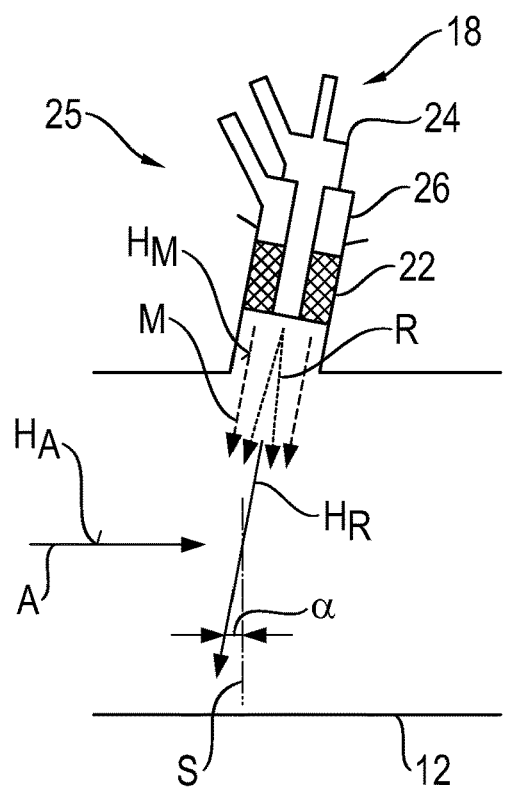
FIG. 6 is a view of an alternative type of reactant release corresponding to FIG. 2.

FIGS. 5 and 6 show embodiments in which the reactant release arrangement 18 is arranged essentially at right angles, but at an angle α in relation to the exhaust gas duct 18 or a fictitious flow orthogonal line S extending essentially orthogonally to a main direction of flow of the exhaust gas stream, $H_A$. This flow orthogonal line S may be represented, for example, by and located in a flow cross-sectional area directed orthogonally to the main direction of flow of the exhaust gas stream, $H_R$, in the exhaust gas duct 12.

FIG. 5 shows an embodiment, in which the reactant release arrangement 18 is set such that a positive angle α is obtained between the main direction of flow of the reactant stream, $H_R$, and the flow orthogonal line S, i.e., the flow cross-sectional area in the exhaust gas duct 12. Positive means in the sense of the present invention that on resolution of the vector, the main direction of flow of the exhaust gas stream, $H_R$, has a flow direction component essentially orthogonal to the main direction of flow of the exhaust gas stream $H_A$, and a main direction component essentially in parallel to and pointing in the same direction as the main direction of flow of the exhaust gas stream, $H_A$.

The reactant release arrangement 18 is set in the opposite orientation in the example shown in FIG. 6, so that a negative pitch angle α will be obtained between the main direction of flow of the reactant stream, $H_R$, thus also the main direction of flow of the bypass flow, HM, on the one hand, and the flow orthogonal line S directed orthogonally to the main direction of flow of the exhaust gas stream, $H_A$, which latter main direction of flow is present in this area. Negative means in the sense of the present invention that on resolution of the vector, the main direction of flow of the reactant stream, $H_R$, has a main flow direction component essentially orthogonal to the main direction of flow of the exhaust gas stream, $H_A$, and a flow direction component essentially in parallel to but directed opposite the main direction of flow of the exhaust gas stream, $H_A$.

The arrangement shown in FIGS. 5 and 6, in which the reactant stream R and hence also the bypass flow M are introduced essentially preferably but not exactly orthogonally to the main direction of flow of the exhaust gas stream, $H_A$, can be used, for example, especially advantageously if, when a so-called compact mixing section is built, the reactant is introduced in a section of the exhaust gas duct 12 extending essentially linearly between a particle filter positioned upstream and a catalytic converter arrangement positioned downstream, for example, for carrying out a selective catalytic reduction. The pitch angle α should be especially advantageously in a range of +45° to −45°, an arrangement in which the angle α is either in the range of +5° to +30° or in the range of −5° to −30° being especially advantageous. As a result, the good mixing that can be achieved by introducing the reactant essentially at right angles to the main direction of flow of the exhaust gas stream, $H_A$, can be utilized hereby, and, on the other hand, the risk of the reactant being forced back substantially by the exhaust gas stream A in the direction of the reactant release unit 24 is very low. To support the mixing of the reactant with the exhaust gas, a mixing device or an auxiliary device supporting the evaporation of the reactant droplets may be provided in the area or wall area of the exhaust gas duct 12 located opposite the introduction of the reactant.

Figure 7:
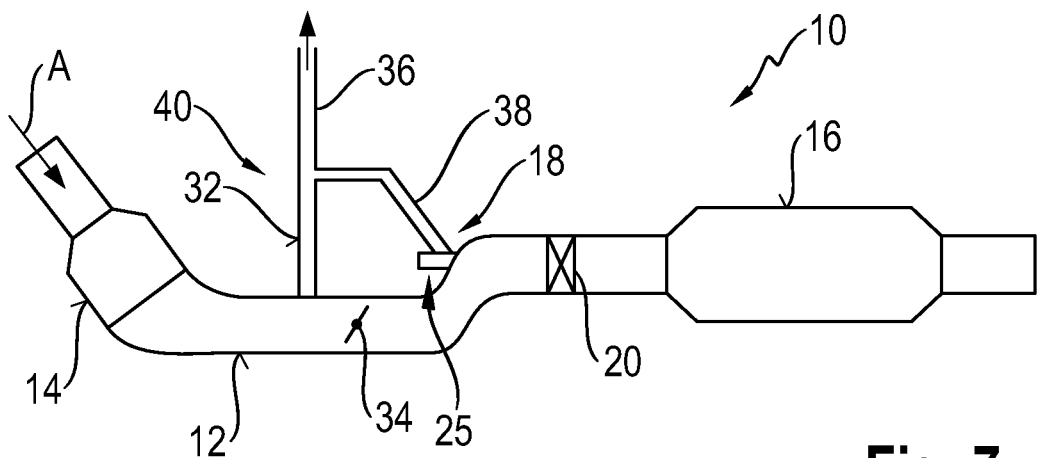
FIG. 7 is a view of an alternative embodiment of the exhaust system corresponding to FIG. 1.

FIG. 7 shows an alternative embodiment of the exhaust system 10, and exhaust gas is also branched off from the exhaust gas stream A in this embodiment and is used as a bypass flow gas to generate the bypass flow in the above-described manner. An exhaust gas return line 36 also providing the exhaust gas branch duct 32 is also provided in the embodiment shown in FIG. 7. A line 38, via which a part of the exhaust gas branched off from the exhaust gas stream A via the exhaust gas branch channel 32 is sent in the direction of the reactant release arrangement 18 and is used there as a bypass flow gas to generate the bypass flow, is branched off from this exhaust gas return line 36 feeding exhaust gas back in the direction of an internal combustion engine. The arrangement is preferably such here as well that the branching off of a part of the exhaust gas from the exhaust gas stream A or from the exhaust gas duct 12 takes place upstream of a throttle arrangement in order to make it possible to set the pressure conditions and thus also the quantity of exhaust gas branched off in this area.

It should be noted that the branching off of the exhaust gas could also take place in an area located farther upstream, i.e., in an area in which an even higher pressure is generally present in the exhaust gas stream, especially also in an area upstream of a particle filter.

Consequently, the exhaust gas branch duct 32 forms essentially a bypass flow gas source 40 in the embodiment variants described with reference to FIGS. 1 and 7, and the quantity of the exhaust gas fed from this bypass flow gas source 40 in the direction of the reactant release arrangement 18 can be preset, for example, by a corresponding selection of the flow cross sections and can be influenced by corresponding adjustment of the throttle arrangement 34 or of an alternatively or additionally provided exhaust gas quantity-setting valve arrangement.

Figure 8:
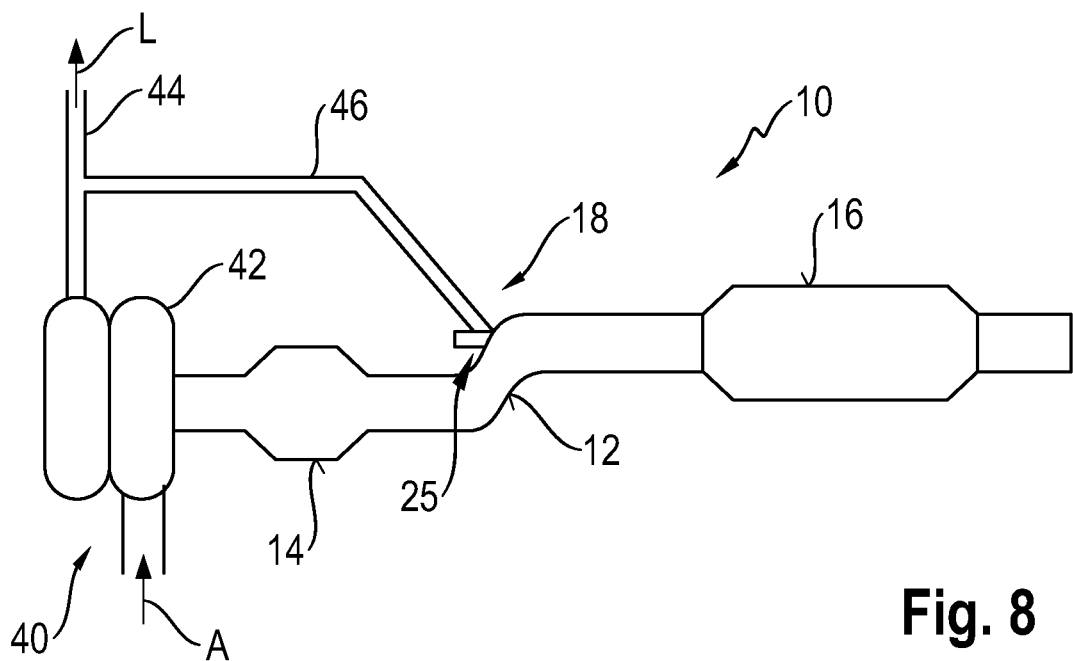
FIG. 8 is a view of an alternative embodiment of the exhaust system corresponding to FIG. 1.

FIG. 8 shows an exemplary embodiment, in which air is used as the bypass flow gas and is fed to the reactant release arrangement 18. The exhaust system 10 shown in FIG. 8 comprises in an upstream area an exhaust gas turbocharger 42, which provides essentially the bypass flow gas source 40 in this embodiment. The exhaust gas stream entering the exhaust system 10 or the exhaust gas turbocharger 42 is used to generate a charging air stream L and to feed same in the direction of the internal combustion engine. A charging air line 44 guiding the charging air stream L from the exhaust gas turbocharger 42 in the direction of the internal combustion engine, for example, via an intercooler, is in connection with the reactant release arrangement 18 or the bypass flow release unit 26 via a branch line 46. Part of the charging air being fed under comparatively high pressure in the direction of the internal combustion engine can thus be used as a bypass flow gas in order to generate the bypass flow M. The pressure conditions and the quantity of bypass flow gas being fed to the bypass flow release unit 26 can be influenced, for example, by correspondingly setting the flow cross sections, on the one hand, and, on the other hand, by a setting valve arrangement provided, for example, in the area of the branch line 46 in this case as well. The configuration and the arrangement of the reactant release arrangement 18 and of the bypass flow generation arrangement 25 may correspond here to those described above in reference to FIGS. 2 through 6.

The use of air as the bypass flow gas offers various advantages. On the one hand, it can be assumed that the air in the charging air stream L will still have a markedly lower temperature than the exhaust gas stream A even after an increase in pressure in the exhaust gas turbocharger 42. The reactant release unit 24 can therefore be cooled by the air used as bypass flow gas and also shielded by the comparatively cold bypass flow M against the markedly hotter exhaust gas stream A. In particular, this area is cooled by the area of the reactant release unit 24 surrounded by the bypass flow release chamber 28 and the bypass flow release body 30, and heating of the area of the reactant release unit 24 located farther away from the exhaust gas duct 12 is also avoided. The ability of the reactant release unit 24 to function can thus be ensured without additional cooling measures. Further, the air being used as bypass flow gas has a markedly lower volume percentage or water partial pressure than the exhaust gas stream. This supports the evaporation of the reactant being carried in the reactant stream and surrounded by the bypass flow M during the introduction into the exhaust gas duct 12 and thus it also leads to better mixing of the reactant with the exhaust gas.

Other system areas present in a vehicle and operating with compressed air or generating compressed air may also be used as a bypass flow gas source instead of the exhaust gas turbocharger 42. For example, a pneumatic brake system present especially in a utility vehicle can thus be used to branch off part of the compressed air preset in it and to feed it as a bypass flow gas to the bypass flow generation arrangement 25. A mechanical charger, generally known as a compressor, may also be used to branch off part of the compressed air generated by it and to use it as bypass flow gas. The advantage of the use of the exhaust gas turbocharger 42 or of the charging air stream L to branch off bypass flow gas is that the air is also heated due to the compression of the air generated in the exhaust gas turbocharger 42. The air branched off as bypass flow gas is thus also heated somewhat, but it is markedly colder than the exhaust gas flowing in the exhaust gas duct 12. Thus, a cooling effect can be generated, on the one hand, for the reactant release unit 24, but, on the other hand, better evaporation of the reactant fed in the liquid form can be achieved due to the somewhat warmer air.

Figure 9:
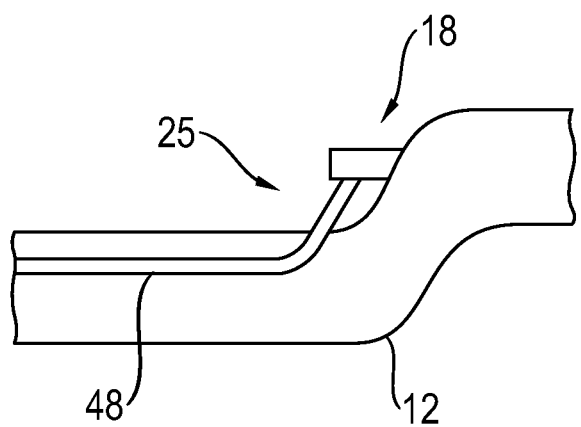
FIG. 9 is a simplified detail view of an exhaust system, in which the bypass flow gas used to generate a bypass flow is heated by thermal interaction with the exhaust gas.

This effect of heating or preheating of the air used as a bypass flow gas can also be achieved in another way. For example, FIG. 9 shows a detail of the exhaust gas duct 12, in which a line 48 is led to the bypass flow generation arrangement 25. This line 48 may correspond, for example, to the branch line 46 in FIG. 8, but it may also be a line carrying air as a bypass flow gas from another bypass flow gas source to the bypass flow generation arrangement 25, for example, also a line 48 leading from a compressed air pump. The line 48 is led in some areas in the interior of the exhaust gas duct 12, so that a thermal interaction between the exhaust gas of the exhaust gas stream, on the one hand, and the air flowing in the branch line 48, on the other hand, can be used to heat this air due to the flow of exhaust gas around the branch line 48. The air fed into the bypass flow generation arrangement 25 will thus be warmer than the ambient air, but it will have a lower temperature than the exhaust gas flowing in the exhaust gas duct 12.

Figure 10:
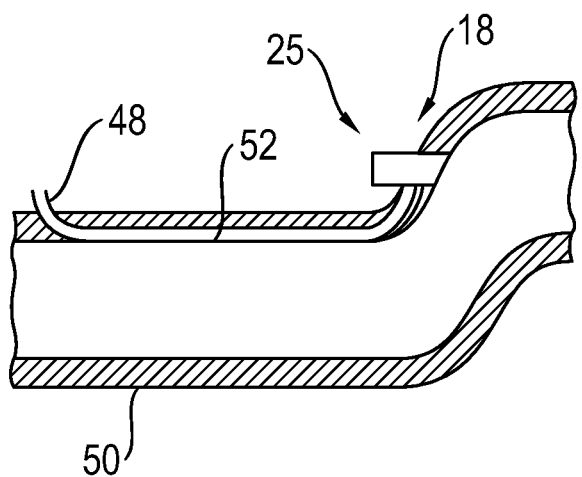
FIG. 10 is a view of an alternative embodiment corresponding to FIG. 9.

A variant of this principle of operation is shown in FIG. 10. It is seen here that the exhaust gas duct 12 is surrounded at least in some areas by an insulating material 50. The line 48 is led along on the outside 52 of the exhaust gas duct 12 in order to achieve the thermal interaction between the exhaust gas and the air. The line 48 is nevertheless also surrounded by the insulating material 50 in order to avoid heat losses in this area.

Figure 11:
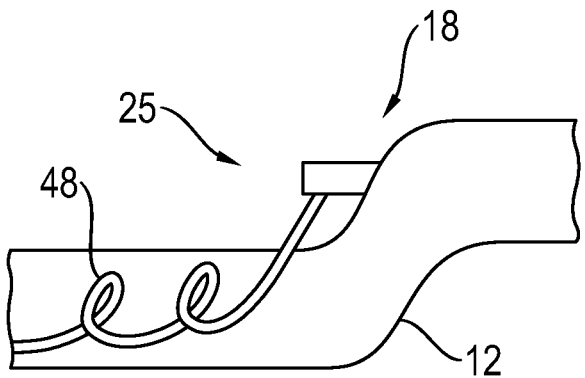
FIG. 11 is another view of an alternative embodiment corresponding to FIG. 8.

In the embodiment shown in FIG. 11, the line 48 extends in the interior of the exhaust gas duct 12. Similarly to the embodiment according to FIG. 9, the line 48 is led out of the exhaust gas duct 12, for example, where the bypass flow generation arrangement 25 is provided at the exhaust gas duct 12. The line 48 has a helically wound configuration in the embodiment variant shown in FIG. 11 for improved thermal interaction, especially to increase the length of the interaction section.

It should be noted that various of the above-described embodiment aspects may, of course, also be combined. For example, if there is a corresponding need for bypass flow gas, a combination of exhaust gas, on the one hand, and air, on the other hand, can thus be used to provide the bypass flow gas. For example, part of the exhaust gas could be branched off from the exhaust gas stream A in the form shown in FIG. 1 or 7, while a part of the charging air L leaving the exhaust gas turbocharger 42 is branched off and is likewise fed to the bypass flow generation arrangement 25. For example, the two gas streams may be fed together or separately from one another into the bypass flow release chamber 28 and mixed there.

While specific embodiments of the invention have been shown and described in detail to illustrate the application of the principles of the invention, it will be understood that the invention may be embodied otherwise without departing from such principles.

What is claimed is:

1. An exhaust system for an internal combustion engine of a vehicle, the exhaust system comprising:
   an exhaust gas duct carrying an exhaust gas stream;
   a reactant release arrangement releasing a reactant stream into the exhaust gas stream, the reactant release arrangement comprising a reactant release unit releasing the reactant stream via an injection nozzle; and
   a bypass flow generation arrangement generating a bypass flow surrounding the reactant stream released from the reactant release arrangement, the bypass flow fully enveloping and adjoining the reactant stream in relation to a main direction of flow of the reactant, a main direction of flow of the bypass flow corresponding to a main direction of flow of the reactant stream, the bypass flow generation arrangement comprising a bypass flow release unit annularly surrounding the reactant release unit, the bypass flow release unit comprising a porous ring-shaped bypass flow release body, and upstream of the bypass flow release body a ring-shaped bypass flow release chamber formed in a housing and leading to the bypass flow release body arranged in the housing such as to surround the reactant release unit.

2. An exhaust system in accordance with claim 1, wherein the bypass flow release body comprises a sintered body.

3. An exhaust system in accordance with claim 1, further comprising a bypass flow gas source feeding bypass flow gas to bypass flow release unit.

4. An exhaust system in accordance with claim 3, wherein the bypass flow is comprised of an air stream and that the bypass flow gas source comprises a compressed air source.

5. An exhaust system in accordance with claim 4, wherein the compressed air source comprises:
   an exhaust gas turbocharger; or
   a mechanical charger; or
   a pneumatic brake system; or
   a compressed air pump; or any combination of an exhaust gas turbocharger, a mechanical charger, a pneumatic brake system and a compressed air pump.

6. An exhaust system in accordance with claim 3, wherein the bypass flow is a partial exhaust gas stream and that the bypass flow gas source comprises an exhaust gas source.

7. An exhaust system in accordance with claim 6, wherein the exhaust gas source comprises an exhaust gas branch duct branching off from the exhaust gas duct.

8. An exhaust system in accordance with claim 7, wherein:
the exhaust gas branch duct branches off from the exhaust gas duct upstream of an exhaust gas throttle arrangement; or
an exhaust gas quantity-setting valve arrangement is associated with the exhaust gas branch duct; or
the exhaust gas branch duct comprises an exhaust gas return line; or
any combination of the exhaust gas branch duct branches off from the exhaust gas duct upstream of an exhaust gas throttle arrangement, an exhaust gas quantity-setting valve arrangement is associated with the exhaust gas branch duct and the exhaust gas branch duct comprises an exhaust gas return line.

9. An exhaust system in accordance with claim 1, wherein a main direction of flow of the bypass flow and/or a main direction of flow of the reactant stream of the reactant stream, released from the reactant release arrangement, corresponds to a main direction of flow of the exhaust gas stream of the exhaust gas stream in the exhaust gas duct in the area in which the reactant stream is released.

10. An exhaust system in accordance with claim 1, wherein a main direction of flow of the bypass flow and/or a main direction of flow of the reactant stream of the reactant stream, released from the reactant release arrangement, is directed opposite a main direction of flow of the exhaust stream in the exhaust duct in the area in which the reactant stream is released.

11. An exhaust system in accordance with claim 1, wherein a main direction of flow of the bypass flow and/or a main direction of flow of the reactant stream, released from the reactant release arrangement, in relation to a main direction of flow of the exhaust gas stream in the exhaust gas duct in the area in which the reactant stream is released set at a pitch angle in the range of +45° to −45°, wherein the main direction of flow of the bypass flow and/or the main direction of flow of the reactant stream, has a flow direction component in the direction of the main direction of flow of the exhaust gas stream, in case of a positive pitch angle, and the main direction of flow of the bypass flow and/or the main direction of flow of the reactant stream, has a flow direction component opposite the main direction of flow of the exhaust gas stream, in case of a negative pitch angle.

12. A method for introducing reactant into an exhaust gas stream of an internal combustion engine of a vehicle, the method comprising:
providing an exhaust system comprising an exhaust gas duct carrying an exhaust gas stream, a reactant release arrangement with an injection nozzle for releasing a reactant stream into the exhaust gas stream and a bypass flow generation arrangement for generating a bypass flow surrounding the reactant stream released from the reactant release arrangement;
releasing a reactant stream, with the reactant release arrangement, into the exhaust gas stream; and
generating, with the bypass flow generation arrangement, a bypass flow that surrounds the injection nozzle and the reactant stream circumferentially respect to a direction of flow of the reactant.

13. A method in accordance with claim 12, wherein
the reactant stream is released in a main direction of flow of the reactant stream; and
the bypass flow is released in a main direction of flow of the bypass flow which corresponds to the main direction of flow of the reactant stream.

14. A method in accordance with claim 12, wherein a main direction of flow of the bypass flow and/or a main direction of flow of the reactant stream corresponds to a main direction of flow of the exhaust gas stream in the area in which the reactant stream is released.

15. A method in accordance with claim 12, wherein a main direction of flow of the bypass flow and/or a main direction of flow of the reactant stream of the reactant stream, released from the reactant release arrangement, is directed opposite a main direction of flow of the exhaust stream in the exhaust duct in the area in which the reactant stream is released.

16. An exhaust system comprising:
an exhaust gas duct carrying an exhaust gas stream;
an injection nozzle mounted on said exhaust gas duct and injecting a reactant stream into the exhaust gas stream;
a bypass flow generation arrangement generating a bypass flow surrounding the reactant stream as released from said injection nozzle, the bypass flow fully annularly enveloping and adjoining the reactant stream relative to a main direction of flow of the reactant stream;
a bypass flow release unit including a porous ring-shaped bypass flow release body annularly surrounding said injection nozzle, said bypass flow release unit comprising a housing defining a ring-shaped bypass flow release chamber, said flow release chamber being arranged upstream of said bypass flow release body with respect to the bypass flow, said flow release chamber guiding the bypass flow to the bypass flow release body, said flow release chamber being arranged in said housing to annularly surround said injection nozzle.

17. An exhaust system in accordance with claim 16, wherein:
said injection nozzle is downstream of said bypass flow release body with respect to the bypass flow.

18. An exhaust system in accordance with claim 16, wherein:
said injection nozzle is downstream of said flow release chamber with respect to the bypass flow.

19. An exhaust system in accordance with claim 17, wherein:
said injection nozzle is downstream of said flow release chamber with respect to the bypass flow.

* * * * *